Patented Oct. 22, 1929

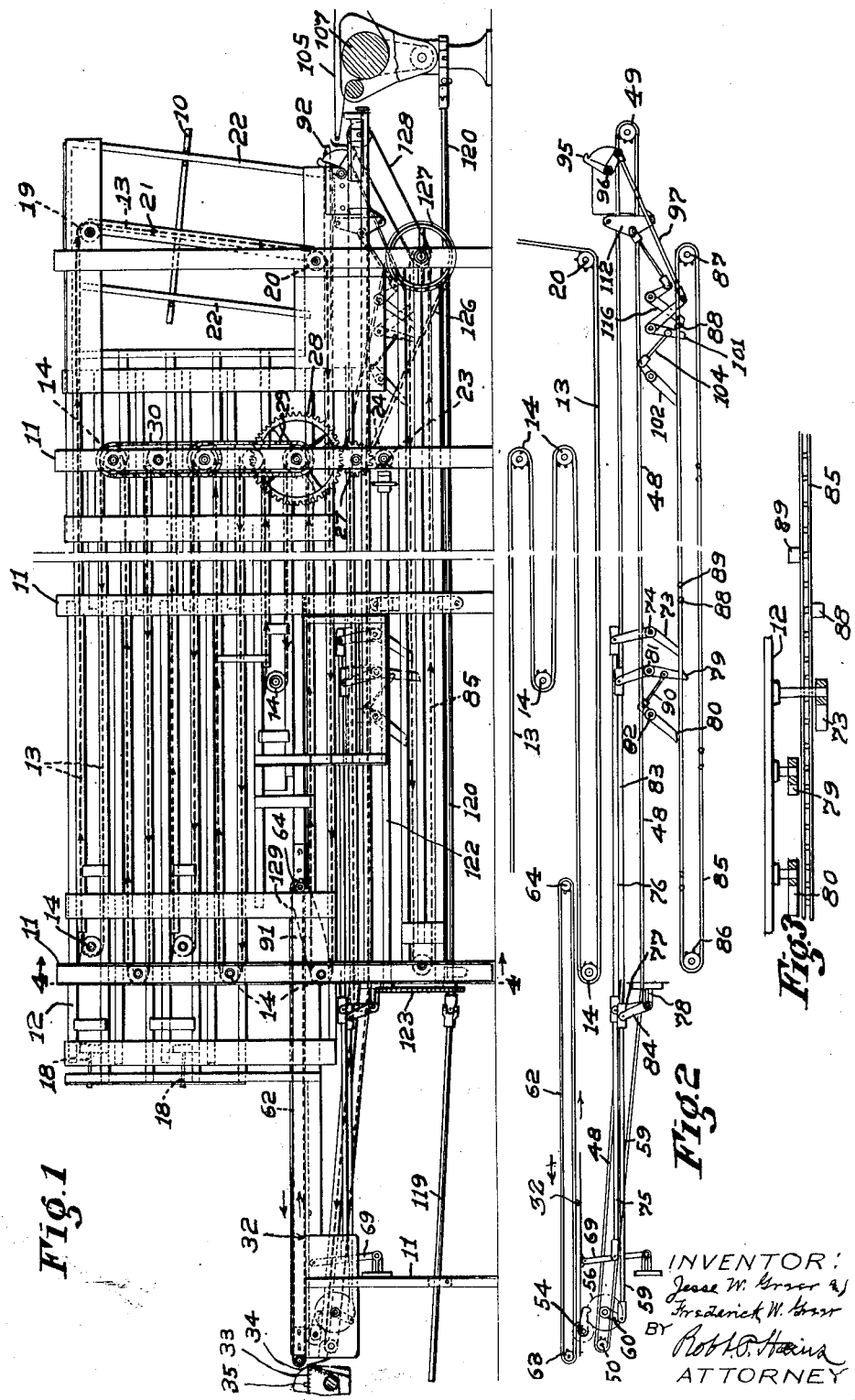

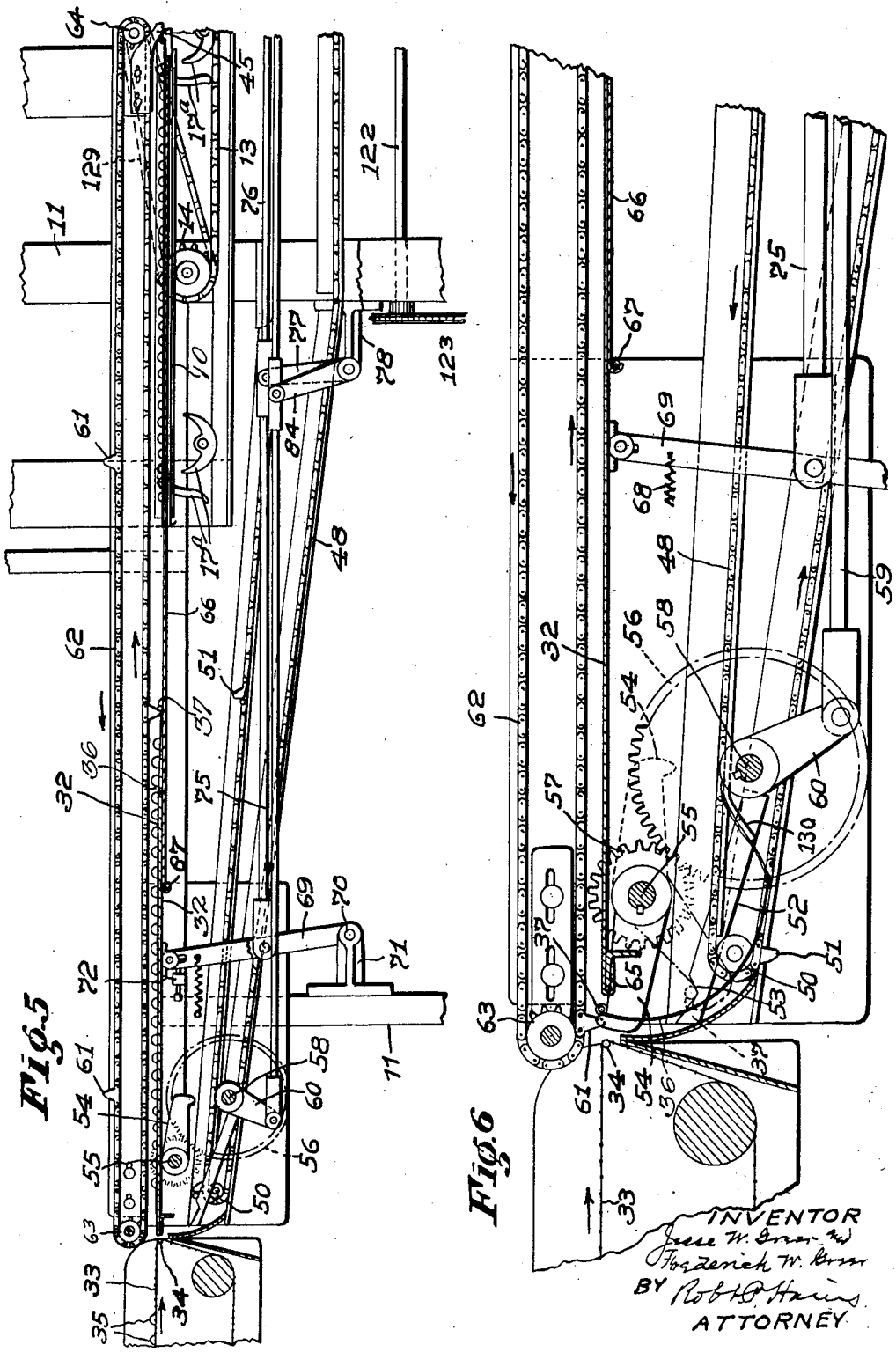

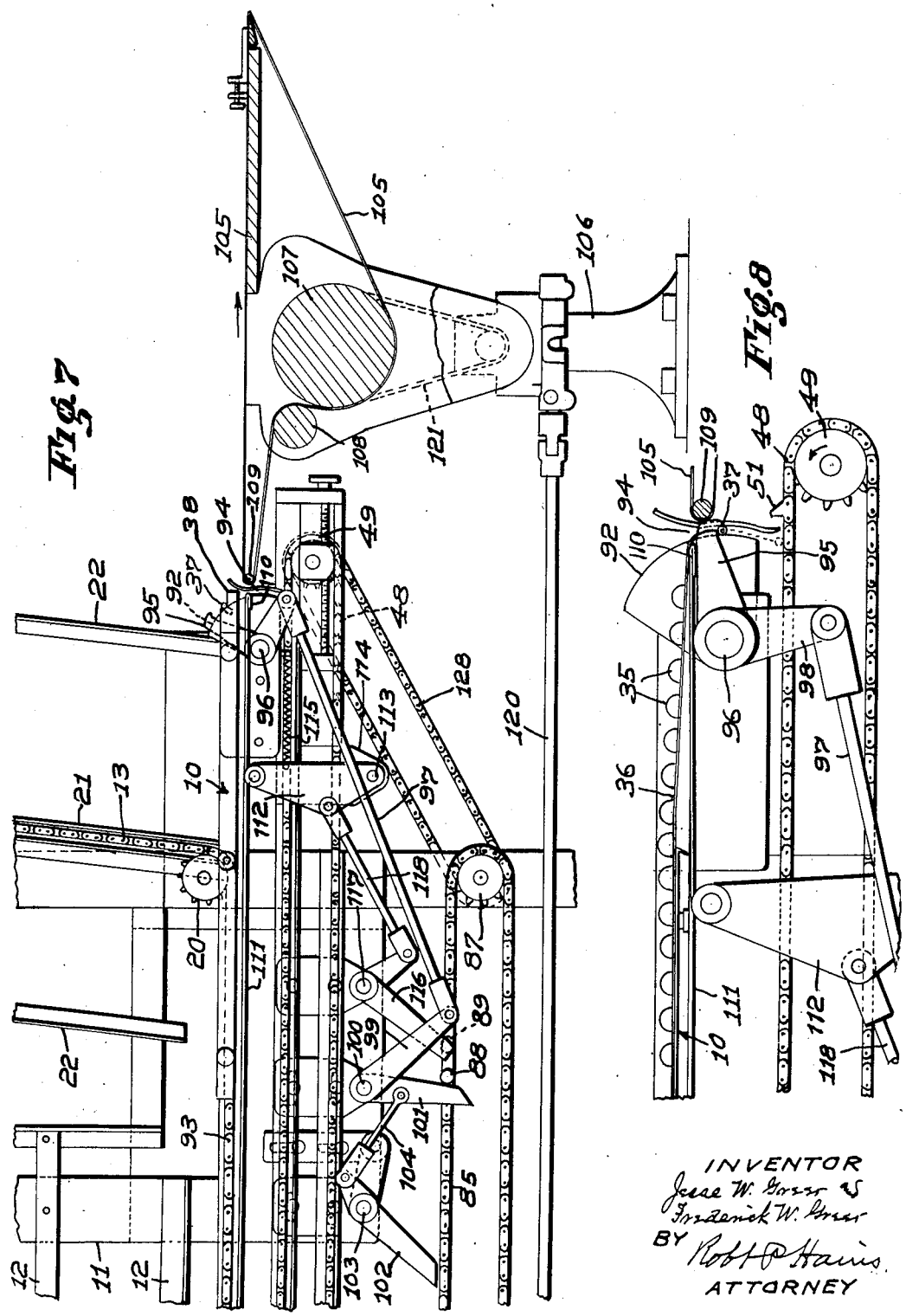

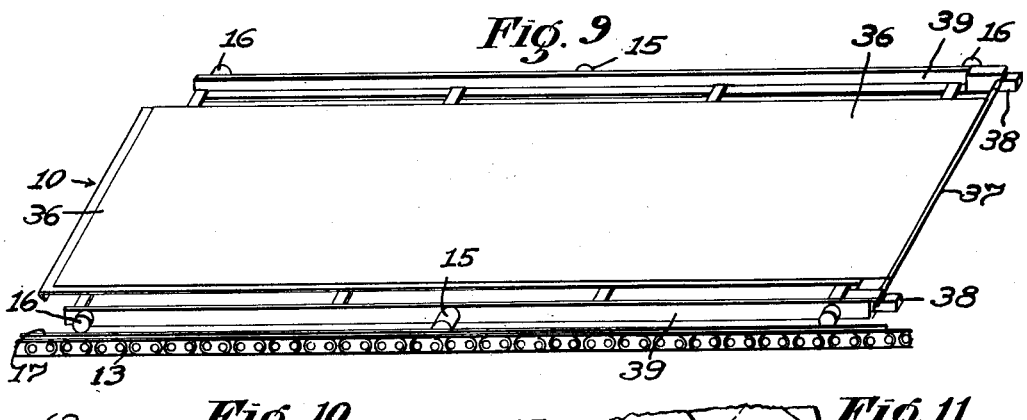
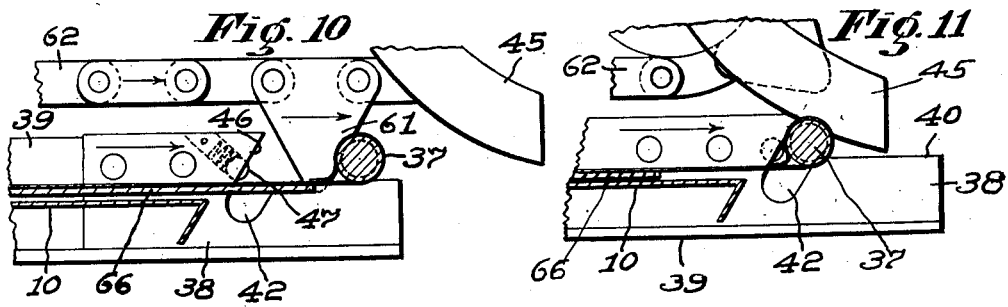
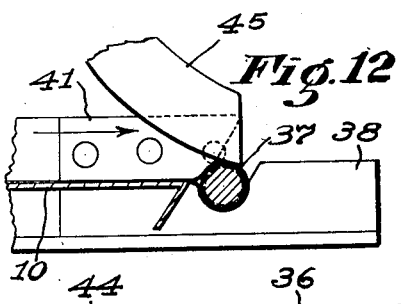
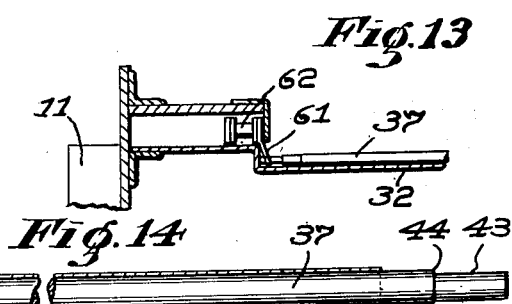
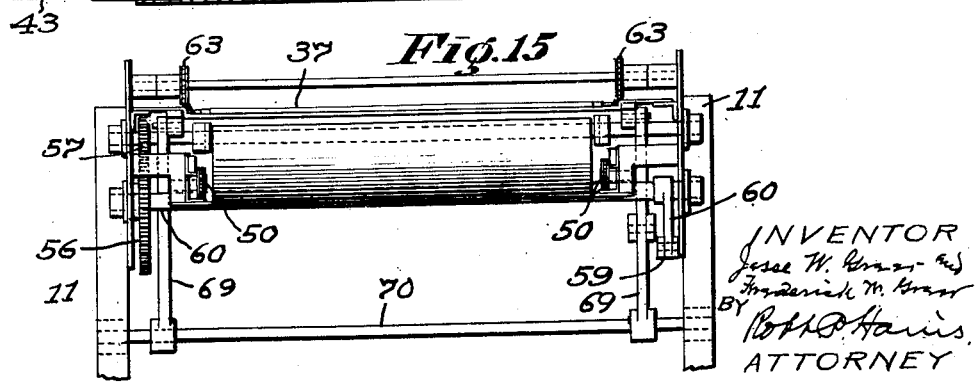

1,732,228

UNITED STATES PATENT OFFICE

JESSE W. GREER AND FREDERICK W. GREER, OF CAMBRIDGE, MASSACHUSETTS

CONFECTION-CONVEYING MACHINE

Application filed September 4, 1928. Serial No. 303,760.

This invention relates to machines for conveying confections and more particularly to means for placing the confections upon traveling trays and for removing them therefrom without breaking or marring the confections. The present invention is directed to various improvements in the confectionery coating machines described and claimed in the J. W. Greer and F. W. Greer Patent No. 1,672,522, granted June 5, 1928.

Candies and cakes when manufactured on a large commercial scale are usually coated by conveying them through a coating machine so that as they pass through this machine, hot chocolate is sprayed upon the confections. The coating covering the confections is in a hot soft condition as the coated confections issue from the coating machine, and it is therefore difficult to handle these freshly coated confections without injuring or marring the appearance of the coating.

The coated confections cannot be packed ready for the market until they have been dried or cooled off sufficiently to harden their outer coating. It is therefore customary to pass the confections through a cooling machine as they leave the coating machine, and in order to facilitate the cooling of the freshly coated confections it is found desirable to place these confections on traveling trays so that the confections can be advanced back and forth along different runs within the cooling machine.

The patent above mentioned is directed to mechanism for placing freshly coated confections upon plaques formed of paper or other flexible material and to means for depositing these loaded plaques upon traveling trays, the construction being such that the loaded plaques are applied to the trays and removed therefrom during the continuous travel of the trays and without injuring or marring the freshly coated confections. The present invention relates to further improvements to this end.

One of the features of the present invention resides in improved means for applying the loaded plaques to the trays and for removing the plaques therefrom during the travel of the trays along a predetermined path.

Another feature of the present invention resides in means for returning the plaques that have been removed from the trays to the plaque loading position independently of the trays.

Another feature of the present invention resides in improvements in the construction of the trays and in the bars attached to the forward ends of the plaques, whereby the plaques may be more readily attached to the trays and removed therefrom than in the construction forming the subject matter of the patent above mentioned, and a still further feature of the present invention resides in the mechanism for actuating the various operating parts in timed relation.

The above and other features of the invention and novel combination of parts will be best understood from the following description when read in connection with the drawings which illustrate one good practical form of the invention:

In the drawings,—

Fig. 1 is a side elevation of the complete machine constructed in accordance with the present invention;

Fig. 2 is a diagrammatic view showing the driving chains and associated parts which are more or less concealed in the machine shown in Fig. 1;

Figure 4:
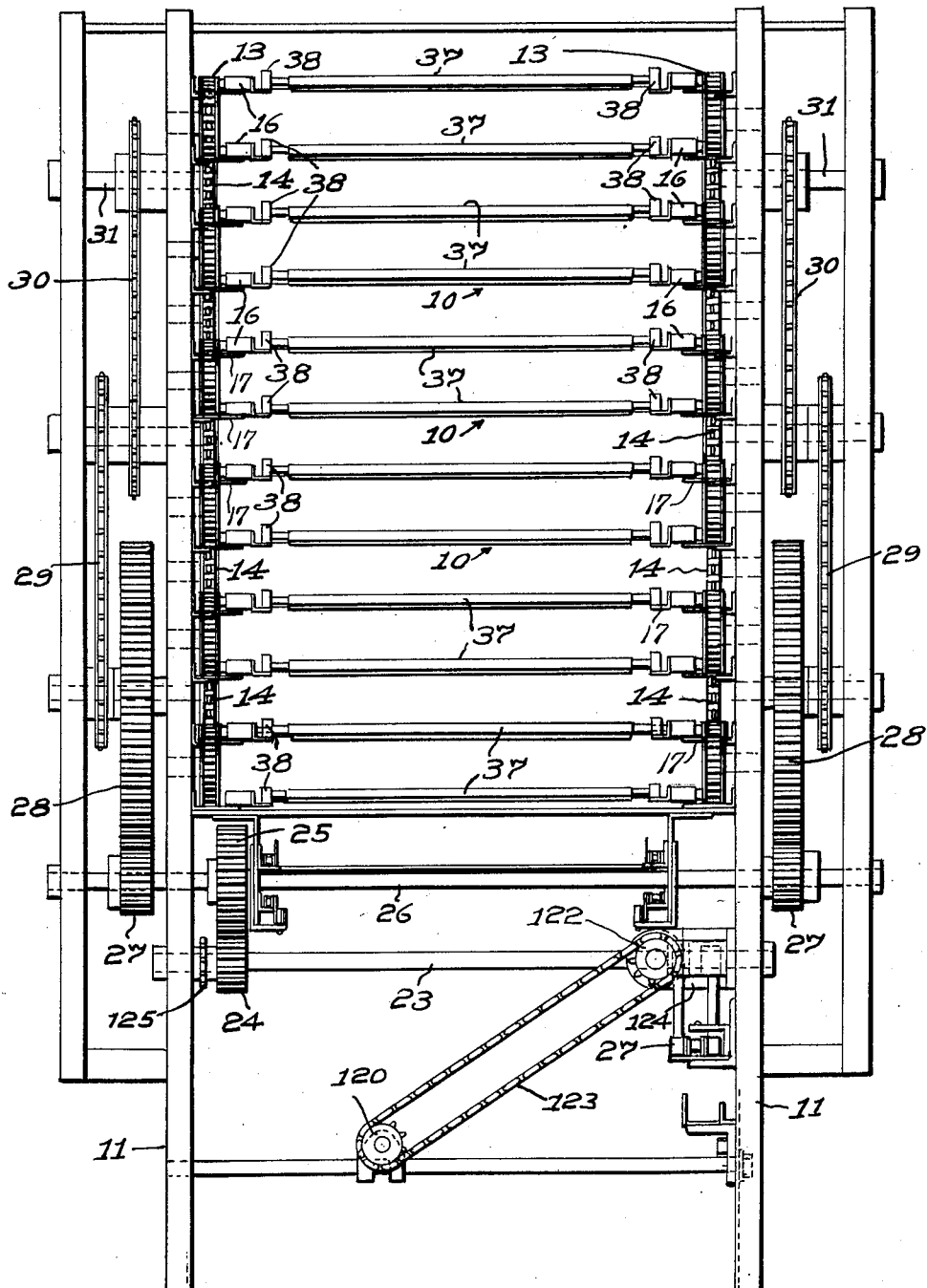

Fig. 3 on a somewhat enlarged scale is a plan view of three operating levers and their actuating means, to be described;

Fig. 4 on an enlarged scale is a vertical sectional view taken on the line 4—4 of Fig. 1;

Fig. 5 is an enlarged side view with parts in section of the left-hand end portion of the machine shown in Fig. 1;

Fig. 6 on a still larger scale is a side elevation of parts shown in Fig. 5;

Fig. 7 is an enlarged side elevation with parts in section of the right-hand end portion of the machine shown in Fig. 1;

Fig. 8 on a still larger scale is a side elevation of parts shown in Fig. 7;

Fig. 9 is a perspective view of one of the plaque supporting trays having a plaque mounted thereupon;

Fig. 10 is a longitudinal sectional view of the front end portion of the tray and illustrates the mechanism for engaging the bar at the forward end of a plaque with the bar receiving notches of the tray;

Fig. 11 is a view similar to Fig. 10, but shows the plaque bar advanced to the mouth of the bar receiving slots;

Fig. 12 is a similar view but shows the position of the parts at the instant the plaque bar is forced into the bar receiving slots of the tray;

Fig. 13 is a vertical sectional view through a portion of the plaque supporting table at the left-hand end of Fig. 1 and shows one of the chains for advancing the plaque bar along the supporting table;

Fig. 14 is a side view of a plaque supporting bar, the plaque secured thereto being shown in section; and Fig. 15 is a front elevation of the left-hand end portion of the machine shown in Fig. 1.

The mechanism forming the subject matter of the present invention is adapted to load the plaques, apply them to traveling trays and then remove the loaded plaques from the trays, and may be associated with various types of machines employing trays adapted to be advanced along a predetermined path.

The trays 10 illustrated in the drawings are adapted to convey the freshly coated confections through a cooling machine having any preferred construction and which may be supported by the uprights 11 connected by the longitudinally extending beams 12, the arrangement being such that the trays will be advanced back and forth along different runs within the cooling chamber so that the loaded trays will pass upwardly from one run to another. The trays 10 are advanced through the cooling machine by the chains 13 disposed at the opposite sides of the machine to pass around the various sprockets 14 and each tray 10 is provided at its central transverse axis with the oppositely extending trunnions 15 which serve to pivotally secure the tray to the tray-advancing chains 13 (see Fig. 9). Each tray is provided adjacent its ends with the laterally projecting lugs 16 adapted to rest upon fixed angle irons or runways 17 which serve to support the trays and maintain them in a horizontal position while traveling along a run, and as the trays pass upwardly from one run to another they are maintained in a horizontal position by the engagement of the end lugs 16 with the arcuate guide brackets 17ª which brackets may have the construction shown and described in the J. W. Greer Patent No. 1,321,520, granted Nov. 11, 1919.

The construction of the cooling chamber so far described is preferably such that by the time the confections have reached the uppermost run of the cooling chamber the coatings upon the confections will have been cooled sufficiently to permit the same to be packed in boxes ready for the market and it will be apparent that the time required for a particular tray to travel entirely through the cooling machine may be varied as desired by increasing either the length or the height of the cooling machine to thereby increase the length of each run or the number of such runs as desired.

The tension of the tray advancing chain 13 may be varied as desired by adjusting the chain tightening devices 18. In the embodiment of the invention illustrated the trays 10 are moved downwardly near the right-hand end of the machine, along an approximately vertical path from the uppermost run to the lowermost run of the cooling machine. This is accomplished by passing the tray advancing chain 13 downwardly about the upper sprockets 19 to the sprockets 20 disposed along the lowermost run of the trays, and the downwardly extending portion of the chains 13 may be guided by the angle irons 21 disposed at the opposite side of the machine and extending downwardly from the upper sprockets 19 to the lower sprockets 20. The trays 10 are maintained in substantially a horizontal position while moving downwardly by the guide bars 22 adapted to engage the side lugs 16 of a tray and to cooperate therewith to limit the rocking movement of the tray about its supporting trunnions 15. The tray advancing chains 13 are preferably driven at a number of points along their path of travel to facilitate the passage of the trays along the different runs within the cooling machine.

This is accomplished in the construction shown by driving a number of the chain engaging sprockets 14 by means of the driving mechanism best shown in Fig. 4, wherein it will be seen that a transversely extending power shaft 23 is provided which is driven by mechanism to be described. This shaft is disposed below the lowermost path traveled by the trays 10, and the shaft 23 is provided with a pinion 24 that meshes with a gear 25 mounted upon a transversely extending shaft 26 and the shaft 26 is provided at each end with a pinion 27 adapted to drive the large gears 28 disposed at the opposite sides of the cooling machine. The gears 28 drive chains 29 and 30 disposed at each side of the machine and these chains drive stub shafts 31 which serve to support and drive the chain advancing sprockets 14. It will be understood that the cooling machine described is preferably provided with enclosing walls not shown, and that air currents or other cooling medium may be employed to promote cooling of the confections being advanced through the machine by the trays.

As above pointed out the confectionery conveying machine forming the subject matter of the present invention is adapted to receive the freshly coated confections as they leave the coating machine, and the embodiment of the present invention shown in Fig. 1 is therefore illustrated as having a table 32 which is adapted to receive the freshly coated confections. The construction of this table 32 is such that its left-hand end extends into close proximity to the delivery end of the upper run of a wire conveyor apron 33 such as commonly employed in coating machines to advance the confections to be coated under the coating sprays. This wire apron 33 has the usual small roller 34 disposed at its discharge end so that the upper run of the conveyor apron will terminate in close proximity to the outer end of the confectionery receiving table 32; this being desirable in order that the confections 35 will pass smoothly from the apron 33 to the table 32.

In accordance with the present invention the confections 35 are not deposited directly upon the trays 10, but are placed upon plaques 36 formed of paper or other flexible material and then these plaques are placed upon the trays, to be conveyed thereby through the cooling machine. In carrying out this feature of the invention each plaque 36 is provided at its forward end with a bar 37 about which the forward end portion of the plaque is looped and firmly secured as will be apparent from Figs. 10 and 14. These bars serve to help convey the plaques to and from the trays and also to maintain the plaques in place upon the trays, and one of the important features of the present invention resides in the construction of the plaque bars 37 and the means provided at the forward ends of the trays 10 for receiving these bars and frictionally retaining them in place.

In carrying out this feature of the present invention each tray 10 is provided at its forward end with the extensions or projecting blocks 38 disposed at the opposite sides of the tray and which conveniently are secured to the side beams 39, constituting the frame of the tray. Each block 38 has a rod supporting surface 40 disposed below the uppermost surface 41 of the block and adjacent the rear portion of each rod supporting surface is provided an inclined notch 42 adapted to receive the reduced end 43 of a plaque bar 37, the arrangement being such that the shoulders 44 upon the bars 37 will abut against the inner face of the blocks 38 to thereby limit the movement of the bar 37 in the direction of its length as long as such bar is supported by a tray 10. It should be noted that the construction of the bar supporting means just described is such that if a bar 37 is placed upon the bar supporting surfaces 40 of the forward end of the tray in the position in which it is shown in Fig. 10 and then the movement of the bar is retarded by a fixed stop 45 while the tray continues to advance in the direction indicated by the arrow in Fig. 10, the travel of the tray will serve to engage the bar 37 with the rear wall 46 of the inclined slot 42 to thereby force the rod downwardly into the slot 42 into the position in which it is shown in Fig. 12 and the bar is preferably frictionally held in the position in which it is shown in Fig. 12 by locking means which may conveniently constitute a spring pressed ball 47 which ball is normally held depressed by a spring as shown in Fig. 10.

In carrying out the present invention the confections 35 are deposited upon the plaques 36 at the left-hand end of the machine shown in Fig. 1 as these plaques are drawn upwardly around the edge of the table 32 as will presently be more fully pointed out, and the plaques are removed from the trays 10 and the confections are discharged from the plaques as these plaques reach the right-hand end of the machine shown in Fig. 1. As soon as the confections are discharged from a plaque at the right-hand end of the machine of Fig. 1 such plaque, in accordance with the present invention, is returned to the plaque loading position at the left-hand end of the machine, independently of the plaque supporting trays. This is accomplished by providing a plaque advancing chain 48 at each side of the machine. These chains pass around the sprockets 49 and 50 disposed near the opposite ends of the machine, as will be apparent from Figs. 1 and 2. These chains are provided with a number of bar engaging projections 51 adapted to engage the reduced ends 43 of the plaque bars 37 and convey these bars and attached plaques to the left-hand end of the machine. This constitutes a very simple and satisfactory means for conveying the empty plaques from the unloading to the loading position.

As soon as the unloaded plaques have reached the left-hand end of the machine shown in Fig. 1 it is desirable to carry these plaques upwardly around the outer end of the table 32 so that the confections 35 will be deposited upon these plaques as they are moved upwardly around the outer edge of the table 32 and along the upper face of this table. This is accomplished, in accordance with the present invention, by providing below the table 32 near the left-hand end thereof the bar supporting brackets 52 having the notches 53 which constitute recesses in which the ends of a bar 37 may rest ready to be carried upwardly to the table 32 by means to be described. The bar supporting brackets 52 are so arranged that the bars 37 advanced by the chains 48 will be delivered successively to the position in which the bar 37 is shown in dotted lines in Fig. 6. This is due to the fact that the notches 53 at the opposite sides of the machine are so positioned that as each bar reaches the end of the upper run of the chain 48 it will be forced into the notches 53 by the rod advancing lugs 51 as these lugs pass around the sprocket 50.

It will be understood from the construction just described that the empty plaques are advanced by the chains 48 from the unloading position to adjacent the loading position so that as each bar approaches the left-hand end of the machine of Fig. 1 it is directed into the supporting notches 53 in position to be carried upwardly by the rocking arms 54 into a position to be advanced along the upper face of the table 32.

This is accomplished by providing the transversely extending shaft 55 having mounted thereon near its opposite ends the bar lifting arms 54 and the desired rocking movement is imparted to these arms by imparting an oscillatory movement to a gear 56 that meshes with a pinion 57 secured to the shaft 55. The gear 56 is secured to a rocking shaft 58 and rocking movement is imparted to the shaft 58 by a connecting rod 59 one end of which is pivotally secured to an arm 60 rigidly secured to the rocking shaft 58. After a plaque bar 37 has been carried upwardly to the position in which it is shown in full lines in Fig. 6 it is advanced along the upper face of the table 32 by projections 61 carried by the chains 62 disposed at the opposite sides of the table 32 and which chains pass about the chain supporting sprockets 63 and 64.

The plaques 37 as they are drawn upwardly around the outer end of the table 32 should be supported quite close to the discharge end of the upper run of the wire conveying apron 33 so that the freshly coated confections will move smoothly from the apron 33 to the plaque 36. In order to facilitate this a knife edge bar 65 at the left-hand end of the table 32 and about which the plaque is drawn, is mounted for sliding movement towards and from the apron supporting roller 34 so that it may be moved away from this roller to clear the plaque bar 37 at the forward end of the plaque and then moved towards the roller 34 to support the plaque in close proximity thereto, and to this end the table 32 is secured to the knife edge bar 65 and is mounted for sliding movement in the direction of its length. The right-hand end portion of this table 32 overlaps a supporting plate or table 66 one end of which is pivotally supported at 67 and the opposite end of the table 66 is mounted for floating movement so that its right-hand end may rest upon a tray 10 to facilitate the passage of a plaque 36 from the table 66 onto a tray, as will be further explained.

The operating parts just described of the present machine are actuated in timed relation so that as a plaque bar 37 is carried upwardly by the bar lifting arms 54, the sliding table 32 will be moved in a right-hand direction to the position in which it is shown in Fig. 6, to thereby clear the rising bar 37, and as soon as the bar has reached the position in which it is shown in full lines in Fig. 6 the sliding table 32 is moved in a left-hand direction into close proximity to the roller 34, as shown in Fig. 5.

The sliding table 32 is normally held in the position in which it is shown in Fig. 5 with its left-hand end in close proximity to the roller 34 by the springs 68 disposed at the opposite sides of the table and connected to the table actuating levers 69 the upper ends of which levers are pivotally secured to the table and the lower ends of these levers are rigidly secured to a transversely extending shaft 70 which is journaled in the supporting brackets 71. The movement of the table 32 in a left-hand direction under the action of the springs 68 may be arrested by the adjustable stops 72. The movement of the table 32 in a right-hand direction to clear a rising plaque bar is effected by connecting an intermediate portion of the lever 69 to an actuating lever 73 which lever is pivoted at 74 to a rail 12 of the machine supporting structure. Rocking movement is imparted from the actuating lever 73 to the rocking lever 69 by the connecting rods 75 and 76 and the adjacent ends of these two rods are pivotally connected to a supporting arm 77 the lower end of which is pivotally connected to a supporting bracket 78 adapted to help support the weight of the rods 75 and 76.

The rocking arms 54 which serve to carry a plaque bar 37 upwardly from the position in which it is supported by the notches 53 to the position in which it is shown in full lines in Fig. 6, are rocked back and forth by actuating levers 79 and 80 and these levers are pivoted at 81 and 82 respectively to the main supporting structure. The upper end of the rocking lever 79 is connected by rods 83 and 59 to the gear actuating arm 60 and the adjacent ends of the rods 83 and 59 are connected to a supporting link 84 extending upwardly from the bracket 78. The levers 73, 79 and 80 are actuated in accordance with the present invention by stops carried by the chain 85 which passes about the spaced sprockets 86 and 87. The lever 73 is actuated by stops 88 disposed at one side of the chain 85 and the levers 79 and 80 are actuated by stops 89 disposed at the opposite side of the chain 85, as will be apparent from Fig. 3. The bar lifting arms 54 are normally retained in the position in which they are shown in Fig. 5 and when they are rocked to the bar lifting position in which they are shown in full lines in Fig. 6 they should be held in this position momentarily so that they will support the bar 37 in the raised position until the sliding table 32 has been moved in a left-hand direction by the springs 68 under the bar 37 to support the bar in this position so that it may be moved along the table 32 by the bar advancing chains 62.

The levers 79 and 80 which actuate the bar lifting arms 54 are so constructed that when the lever 79 is actuated by a stop 89 it will move the arms 54 to their bar lifting position and hold the arms in this position until the traveling stop 89 shifts the rocking lever 80 to thereby actuate the lever 79 through the connecting rod 90 to return the arms 54 to their inactive position in which they are shown in Fig. 5.

The confections 35 advanced by the wire apron 33 are arranged upon this apron in spaced groups in a well known manner so that confections will not be delivered to the table 32 at the instant a new plaque is being carried by the arms 54 to its confectionery receiving position. As soon as the bar at the forward end of the plaque has been carried upwardly onto the upper face of the table 32 and this table has been moved to the confectionery receiving position in which it is shown in Fig. 5, the confections will be deposited onto the plaque 36 by the apron 33 as this plaque is drawn upwardly around the knife edge 65 and along the table 32, and as a result the freshly coated confections are placed upon the plaque without injuring or marring the coating of the confections. The loaded plaque is then advanced along the table 32 towards the cooling machine, as indicated by the arrow in Fig. 1 and is transferred to a tray 10 of the cooling machine, by dragging the loaded plaque from the table 32 onto the floating table 66 the forward end of which is so positioned that it will rest upon a tray 10 as such tray is moved upwardly from its lowermost run to the load-receiving run 91. As a result of this construction the loaded plaque passes gently from the floating end of the table 66 onto the tray upon which the floating end of the table 66 is now resting. The chains 62 for advancing the loaded plaque along the tables 32 and 66 travel at somewhat slower speed than that of the tray advancing chains 13 and as a result the tray just mentioned will overtake the plaque bar 37 as these parts approach the position in which they are shown in Fig. 10 whereupon the travel of the tray 10 will cause the bar 37 to move along the surface 40 at the forward end of a tray into the bar receiving notch 42 as above pointed out, and the bar will be forced downwardly into the notch 42 past the friction holding means 47 under the action of the fixed stops 45 which are supported in the position best shown in Fig. 5.

The engagement of the plaque bar 37 with the notches 42 will cause the travel of the tray 10 in a right-hand direction along the run 91 to pull the loaded plaque off of the floating table 66 onto the traveling tray. It will be apparent from the foregoing that the freshly coated confections are placed upon one plaque after another and that these plaques are gently placed upon the trays as they pass upwardly around the sprocket 14 from the lowermost run to the tray loading run 91 whereupon the loaded trays will move back and forth along the various runs within the cooling machine and upwardly from one run to another until they have passed through the entire cooling machine whereupon they will move downwardly at the right-hand end of the machine between the guideways 21 as above pointed out and the loaded plaques are removed from the trays as they pass downwardly and around the sprockets 20, as will now be explained.

As a tray 10 moves downwardly along the guideways 21 into the position in which it is shown in Fig. 7 the plaque bar 37 will be engaged by the fixed stops 92 which are so positioned that they will force the bar out of the notches 42 as the tray moves into the plane of its lowermost run 93. As soon as this occurs and the tray has moved in a left-hand direction viewing Fig. 7 sufficiently to move the projecting ends 38 of the tray out of the bar supporting position, this bar will be moved downwardly through the bar guiding slots 94, the bar being forced downwardly through this slot by the bar engaging arms 95 secured to the transversely extending shaft 96 and which are normally supported in their raised position in which they are shown in Fig. 7 and are adapted to be moved downwardly to force the bar into engagement with the conveyor chain 48 above described, whereupon the plaque will be carried by the stops 51 upon this chain to the plaque loading position, as above described.

The desired movement is imparted to the bar actuating arms 95 by a connecting link 97 one end of which is connected to an arm 98 adapted to rock the shaft 96 and the opposite end of this link is connected to an arm 99 which is pivotally mounted at 100 and which is provided with an actuating lever 101 which extends downwardly into position to be actuated by a lug 88 upon the chain 85. This lug will shift the link 97 to pull the plaque bar 37 downwardly so that it will rest upon the upper run of the chain 48 and the arms 95 will remain in this position until the stop 88 engages a second lever 102 pivotally mounted at 103 to shift this lever to the position in which it is shown in Fig. 7. This movement of the lever 102 will actuate the connecting link 104 to shift the lever 101 to the position in which it is shown in Fig. 7 to thereby return the arms 95 to the elevated or inactive position in which they are shown in Fig. 7.

The mechanism just described for forcing a bar 37 downwardly through the guiding slot 94 will serve not only to pull the plaque off of a tray 10, but also to remove the confections 35 from such plaque and deposit these confections on a conveyor belt 105 which may be supported independently of the cooling machine by the supporting structure 106, and the belt 105 may be driven by passing the lower run of this belt between the driving roller 107 and the idle roller 108. This belt passes from the roller 108 about a small roller 109 which is disposed in close proximity to the knife edge bar 110 of the cooling machine and about which bar the plaque is drawn as it moves downwardly through the passage 94. It is desirable that the knife edge bar 110, like the knife edge bar 65 above described be mounted for sliding movement towards and from the roller 109 so that it may be shifted to clear the plaque bar 37 as the latter moves downwardly within the guideway 94. This knife edge bar 110 is therefore connected to a sliding plate 111 which is supported in the position in which it is shown in Fig. 7 for sliding movement and the desired movement is imparted to the plate 111 by rocking levers 112 the upper ends of which are connected to the plate 111 and these levers are rigidly secured to and extend upwardly from the transversely extending shaft 113 supported for rocking movement by the brackets 114. The right-hand end of the plate 111 is normally held in close proximity to the roller 94 by the springs 115 which are connected to the rocking levers 112, and the plate 111 is momentarily shifted in a left-hand direction by the rocking lever 116 which is pivotally mounted upon the machine frame at 117 and is adapted to be actuated by the traveling lug 88 to thereby pull the connecting link 118 in a direction to actuate the levers 112 to shift the plate 111 in a left-hand direction, viewing Fig. 7.

The entire cooling machine and the various parts associated therewith and above described should be driven in timed relation with the coating machine having the wire conveyor apron 33, and this may be accomplished by providing the power driven shaft 119 which is driven from the coating machine not shown and this shaft may drive the longitudinally extending shaft 120 which extends entirely under the coating machine and may be provided at its right hand end with gear mechanism for driving a chain 121 adapted to actuate the belt driving roller 107 above described. Rotative movement is imparted from the shaft 120 to a longitudinally extending shaft 122 by a chain 123 and the shaft 122 is provided at its right-hand end viewing Fig. 1 with a bevel gear which meshes with a bevel gear 124 mounted upon the transversely extending power shaft 23, the arrangements being such that the shaft 23 is driven from the main power shaft 120 by the connections just described. This shaft 23 is provided with a sprocket 125 adapted to drive a chain 126 which in turn rotates the sprocket 127 which serves to drive the sprocket 87 to thereby actuate the chain 85 above described. The plaque conveying chain 48 is driven from the sprocket 127 by a chain 128 which serves to drive the sprocket 49 as will be apparent from Fig. 7. The chains 62 which serve to advance the loaded plaques to the trays are driven from a sprocket 14 of the tray advancing chains 13 by the chain 129 but, as above stated, the chains 62 travel at a somewhat slower speed than the tray advancing chains 13.

It will be apparent from the foregoing description when read in connection with the drawings that the unloaded plaques are carried from the right-hand end of the machine shown in Fig. 1 to the left-hand end thereof by the plaque advancing chains 48 which are provided with bar-engaging projections 51 adapted to advance the bar while the plaque attached thereto may drag along a runway or plaque supporting surface 130. These plaque bars are advanced to the position in which one of these bars is shown in dotted lines in Fig. 6, whereupon it is carried upwardly by the bar lifting arms 54 in position to be advanced along the table 32 towards the traveling trays. The freshly coated confections are deposited upon the plaque 36 as it passes upwardly around the knife edge bar 65 and along the upper face of the table 32. The loaded plaque is then deposited upon one of the trays 10 and the plaque bar is forced into the notches 42 at the forward end of the tray by the mechanism above described. The loaded trays are then advanced upwardly within the cooling machine along the different runs and are finally carried downwardly at the right-hand end of the cooling machine, whereupon the loaded plaques are removed from the trays 10 as they reach the position in which the tray 10 is shown in Fig. 7 and these plaques are drawn downwardly around the knife-edge bar 110 which serves to disengage the confections therefrom and deposit the confections upon the conveyor belt 105, which may constitute the packing belt that serves to convey the cooled confections to the persons employed in packing the confections in boxes ready for the market.

What is claimed is:—

1. A machine of the class described, comprising in combination, a series of trays, means for advancing the trays along a predetermined path, flexible plaques for the trays, means for loading and unloading the plaques and for placing the plaques on and removing them from the advancing trays, and means for conveying the plaques from their unloading to their loading position independently of the trays.

2. A machine of the class described, comprising in combination, a series of trays, means for advancing the trays along a predetermined path, flexible plaques for the trays, means for loading and unloading the plaques and for placing the plaques on and removing them from the trays, and means for conveying the plaques from their unloading position to their loading position independently of the trays and along a different path from that of the trays.

3. A machine of the class described, comprising in combination, a series of trays, means for advancing the trays along a predetermined path, flexible plaques for the trays and each plaque having a bar secured to its forward end, means for loading and unloading the plaques and for placing them on and removing them from the trays, and means adapted to engage said bars and carry the plaques from the unloading to the loading position independently of the trays.

4. A machine of the class described, comprising in combination, a series of trays, means for advancing the trays along a predetermined path, flexible plaques, means for loading and unloading the plaques and for placing the loaded plaques on and removing them from the trays, and means other than the trays for supporting the plaques from the time they are unloaded until they are again loaded and operable to convey the plaques from the unloading to the loading position.

5. A machine of the class described, comprising in combination, a series of trays, means for advancing the trays along a predetermined path, flexible plaques having supporting devices attached to their forward ends, means for loading and unloading the plaques and for placing the plaques on and removing them from the trays, and means adapted to engage said plaque supporting devices and advance them from the unloading to the loading position with the plaques suspended from said devices.

6. A machine of the class described, comprising in combination, a series of trays, means for advancing the trays along different runs disposed one above the other so that the trays move upwardly to the successive runs, flexible plaques, means for loading the plaques and for placing the loaded plaques on the trays traveling along a lower run so that the trays carry the loaded plaques upwardly from one run to the other, means for guiding the trays downward from the top to the bottom run, and means adjacent said bottom run for arresting the movement of a plaque so that the continued travel of the tray will cause it to move out from under the plaque.

7. A machine of the class described, comprising in combination, a series of trays, means for advancing the trays along different runs disposed one above the other so that the trays move upwardly to the successive runs, flexible plaques, means for loading the plaques and for placing the loaded plaques on the trays traveling along a lower run so that the trays carry the loaded plaques upwardly from one run to another and then downwardly to an unloading position, and fixed stops adjacent the path traveled by said tray and adapted to arrest the movement of the plaque carried by a tray so that the continued travel of the tray will cause it to move out from under the plaque.

8. A machine of the class described, comprising in combination, a series of trays having frontwardly opening, rod-receiving notches, means for advancing the trays along a predetermined path, flexible plaques, each having a rod at its forward end, a plaque supporting surface along which the loaded plaques are advanced to the trays, means for loading the plaques, and means for advancing the loaded plaques along said surface but at a slower speed than that at which the trays travel so that the trays will overtake the plaques and cause the rod of a plaque to enter the notches of a tray to effect transfer of a plaque from said surface to the tray.

9. A machine of the class described, comprising in combination, a series of trays, means for advancing the trays along a predetermined path, flexible plaques, mechanism for loading and unloading the plaques including two knife-edge bars located at the loading and unloading positions respectively and means for drawing the plaques about these bars, means for automatically shifting said bars to clear the forward ends of the plaques, and mechanism for placing the plaques upon and for removing them from the trays.

10. A machine of the class described, comprising in combination, a series of trays, means for advancing the trays along a predetermined path, flexible plaques, and means for loading the plaques and for placing the loaded plaques upon the trays including a floating plaque supporting surface adapted to extend over a traveling tray and to rest directly thereon to facilitate the passage of the loaded plaques from said surface onto the trays.

11. A machine of the class described, comprising in combination, a series of trays, means for advancing the trays along a predetermined path having different runs disposed one above the other, flexible plaques having bars secured to their forward ends, means for removably securing a bar to a tray and for placing the plaques upon and removing them from the trays, including means for engaging the bars with said securing means, and fixed stops positioned to engage the bars of the trays as the trays are moved downward to thereby utilize the downward movement of the trays to release the bar from said securing means.

12. A machine of the class described, comprising in combination, a series of trays, means for advancing the trays along a predetermined path, flexible plaques having bars secured to their forward ends, means for removably securing a bar to a tray, and means for placing the plaques upon the trays and removing them therefrom including stops adapted to arrest the travel of said bars and thereby utilize the forward movement of the trays to force the bars into and out of engagement with said securing means.

13. A machine of the class described, comprising in combination, a series of trays, means for advancing the trays along a predetermined path, flexible plaques having bars secured to their forward ends, each tray having rod-supporting means at its opposite sides adapted to receive the ends of a plaque bar and comprising a surface upon which the rod rests and an upstanding wall constituting an abutment, and means along the path of travel of a tray for supporting a plaque rod in position to cause its ends to engage said surfaces to thereby effect the placing of a plaque upon a tray.

14. A machine of the class described, comprising in combination, a series of trays, means for advancing the trays along a predetermined path, flexible plaques having bars secured to their forward ends, each tray having notches at its opposite sides to receive a plaque bar and having forward projections adapted to guide a bar into said notches to thereby promote the placing of a plaque upon a tray, and means for loading a plaque and delivering it to a tray.

15. A machine of the class described, comprising in combination, a series of trays, means for advancing the trays along a predetermined path, flexible plaques having bars secured to their forward ends, each tray having downwardly inclined notches at its opposite sides adapted to receive the plaque bar and spring means for yieldingly holding the bar in said notches, and means for loading a plaque and delivering it to a tray.

16. A machine of the class described comprising in combination, a series of flexible plaques, means for loading and unloading the plaques, means for carrying the loaded plaques along a predetermined path, and means for removing the plaques from said carrying means and operable to convey them from the unloading to the loading position along a different path from that of said carrying means.

17. In a machine of the class described, a tray for supporting and advancing a loaded plaque and having projections at its forward end and notches in the projections to receive a bar, and a flexible plaque adapted to receive confections and having a bar secured to its forward end and constructed so that the ends of the bar will rest upon said projections to slide along the same into said notches to thereby hold the plaque upon the tray.

18. In a machine of the class described, a tray for supporting and advancing a loaded plaque and having projections at its forward end and notches in the projections to receive a bar, a flexible plaque adapted to receive confections and having a bar secured to its forward end and constructed so that the ends of the bar will rest upon the projections to slide along the same into said notches, and yielding means for frictionally holding the rods in said notches to thereby retain the plaque in place upon the tray.

19. A machine of the class described, comprising in combination, a series of trays, means for advancing the trays along a predetermined path, flexible plaques for the trays, means for loading the plaques and placing them on the trays, and fixed stops positioned along the path traveled by the trays and adapted to arrest the movement of a plaque carried by a tray so that the continued travel of the tray will cause it to move out from under the plaque.

In testimony whereof, we have signed our names to this specification.

JESSE W. GREER.
FREDERICK W. GREER.